(12) United States Patent
Buika

(10) Patent No.: US 11,987,193 B2
(45) Date of Patent: May 21, 2024

(54) EQUIPMENT AND METHOD FOR ELIMINATING FALSIFICATION OF VEHICLE AIRBAG DEPLOYMENT HISTORY

(71) Applicant: MB MAŽŲJŲ UGDYMAS, Panevėžys reg. (LT)

(72) Inventor: Vilmantas Buika, Panevėžys (LT)

(73) Assignee: MB MAZUJU UGDYMAS, Panevezys Reg. (LT)

( * ) Notice: Subject to any disclaimer, the term of this patent is extended or adjusted under 35 U.S.C. 154(b) by 231 days.

(21) Appl. No.: 17/440,292

(22) PCT Filed: Mar. 18, 2019

(86) PCT No.: PCT/IB2019/052158
§ 371 (c)(1),
(2) Date: Sep. 17, 2021

(87) PCT Pub. No.: WO2020/188317
PCT Pub. Date: Sep. 24, 2020

(65) Prior Publication Data
US 2022/0153217 A1 May 19, 2022

(51) Int. Cl.
*B60R 21/01* (2006.01)
*B60R 21/16* (2006.01)

(52) U.S. Cl.
CPC ..... *B60R 21/01* (2013.01); *B60R 2021/01177* (2013.01); *B60R 2021/167* (2013.01)

(58) Field of Classification Search
CPC .............. B60R 21/01; B60R 2021/167; B60R 2021/01177
See application file for complete search history.

(56) References Cited

U.S. PATENT DOCUMENTS

| 5,815,087 A | 9/1998 | Campbell et al. |
| 6,211,776 B1 * | 4/2001 | Rohrl ...................... B60R 25/24 340/5.1 |

(Continued)

FOREIGN PATENT DOCUMENTS

| DE | 102007023322 A1 | 11/2008 | |
| EP | 1092597 A1 * | 4/2001 | ............. B60R 21/01 |

(Continued)

OTHER PUBLICATIONS

Loison et al., Device for operating a restraint system connected by a bus line, Apr. 18, 2001, EPO, EP 1 092 597 A1, Machine Translation of Description (Year: 2001).*

(Continued)

*Primary Examiner* — James A English
(74) *Attorney, Agent, or Firm* — Tutunjian & Bitetto, P.C.

(57) ABSTRACT

The present invention provides a technical solution eliminating the possibility of falsifying the airbag history in a vehicle. When purchasing the used vehicle, the implementation of this solution makes it easy to check whether the vehicle is equipped with a specific airbag or the airbag is original, i.e., it is installed by a manufacturer, or if the airbag is replaced, whether it was replaced by an authorized service. A tag is attached to the airbag in such a way that if the airbag deploys, the tag will be damaged and cannot function. The tag is an electronic device that stores the unique identification data in its memory that can be read by a dedicated reader. If the tag is undamaged and the reader can retrieve the identification data, then the read data is checked with the data for linking the identification data to the vehicle in the database.

5 Claims, 2 Drawing Sheets

(56) References Cited

U.S. PATENT DOCUMENTS

| | | | |
|---|---|---|---|
| 6,464,249 B1 | 10/2002 | Lacroix | |
| 6,898,489 B1 | 5/2005 | Hayes, Sr. | |
| 2015/0242803 A1* | 8/2015 | Morby | G06Q 10/087 705/28 |

FOREIGN PATENT DOCUMENTS

| | | | |
|---|---|---|---|
| GB | 2433384 | A | 6/2007 |
| WO | 2004022390 | A2 | 3/2004 |
| WO | 2008104298 | A1 | 9/2008 |

OTHER PUBLICATIONS

International Search Report for PCT/IB2019/052158 dated Dec. 12, 2019 (4 pages).

* cited by examiner

EQUIPMENT AND METHOD FOR ELIMINATING FALSIFICATION OF VEHICLE AIRBAG DEPLOYMENT HISTORY

FIELD OF THE INVENTION

The invention relates to the field of vehicles and, in particular, a method and equipment for eliminating the possibility of falsifying the airbag history in a vehicle.

THE RELATED ART

Document WO2004022390A2 (published on 18 Mar. 2004) discloses a technical solution for detecting air bag deployment. The solution is based on sound recording, sound analysis, and, when the airbag deployment sound is sensed, it is considered that the airbag deployed. The solution provided is not very accurate, a detection equipment is complicated, and the use of such equipment does not make it possible to determine which airbag deployed in the vehicle. It is also impossible to find out the airbag history in the vehicle, nothing is mentioned about data storage in the database.

Document WO2008104298A1 (published on 4 Sep. 2008) discloses a technical solution for checking whether an airbag module is properly installed. The cited document makes no mention of the possibility of detecting airbag deployment, finding out the airbag replacement history.

U.S. Pat. No. 6,898,489B1 (published on 24 May 2005) discloses a technical solution closest to the present invention. A system where the absence or damage of a RFID tag indicates the removal or damage of vehicle parts is provided. However, the cited document makes no mention of the availability of the database and vehicle component history in the vehicle.

This invention provides a technical solution that does not have the above deficiencies.

SUMMARY OF THE INVENTION

The present invention provides a technical solution eliminating the possibility of falsifying the airbag history in a vehicle. When purchasing the used vehicle, the implementation of this solution makes it easy to check whether the vehicle is equipped with a specific airbag or the airbag is original, i.e., it is installed by a manufacturer, or the airbag is replaced, if it was replaced, whether it was replaced by an authorized service.

The technical solution is implemented by attaching a tag to the airbag in such a way that, if the airbag deploys, the tag will be damaged and cannot function. The tag is an electronic device that stores the unique identification data in its memory that can be read by a dedicated reader. If the tag is undamaged and the reader can retrieve the identification data, then the read data is checked with the data for linking the identification data with the vehicle in the database. The database stores the data, information that allows you to link tags with vehicles. After checking the tag information read in the car, the airbag history can be determined.

The presented figures are more illustrative; scale, proportions and other aspects do not necessarily correspond to a real technical solution.

DETAILED DESCRIPTION

Modern road vehicles have a wide range of safety means to ensure the safety of those using vehicles. Ones of these are airbags. When the control device identifies the collision with an external obstacle depending on the direction of the obstacle in relation to the vehicle, the proper airbag(s) deploy(s). The deployed airbags provide a shock absorbing barrier between passengers of the vehicle and its structural elements. If after a collision the vehicle is repaired to restore its previous functionality, then components physically damaged during the collision are replaced with others and electronic control devices are also restored and reprogrammed into the previous status. If the repair is done well, even by unauthorized specialists, when checking the vehicle control software settings, it is impossible to detect a previous fault, in other words, even unauthorized specialists may fix the software settings so that it will not be possible to find any information about past events while reading them. This means that it is impossible to check whether the vehicle is equipped with original, reliable airbags and that they will function properly during a collision, or that the airbag control settings hide airbag defects, or even their absence and airbags will not function at the right time. This description provides a technical solution to provide the anti-counterfeiting information about the status, history, originality of the airbag.

The essence of the technical solution is the equipment and method performed by that equipment.

Figure 1:
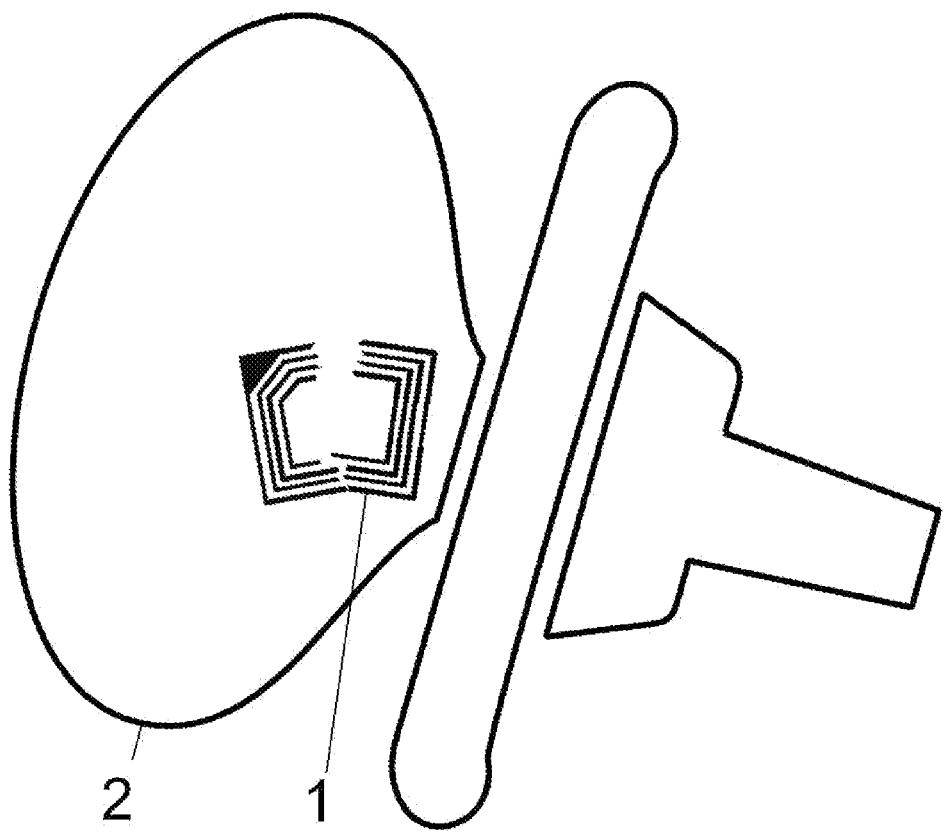
FIG. 1 is a principle illustration of the operation of the present invention.
Figure 2:
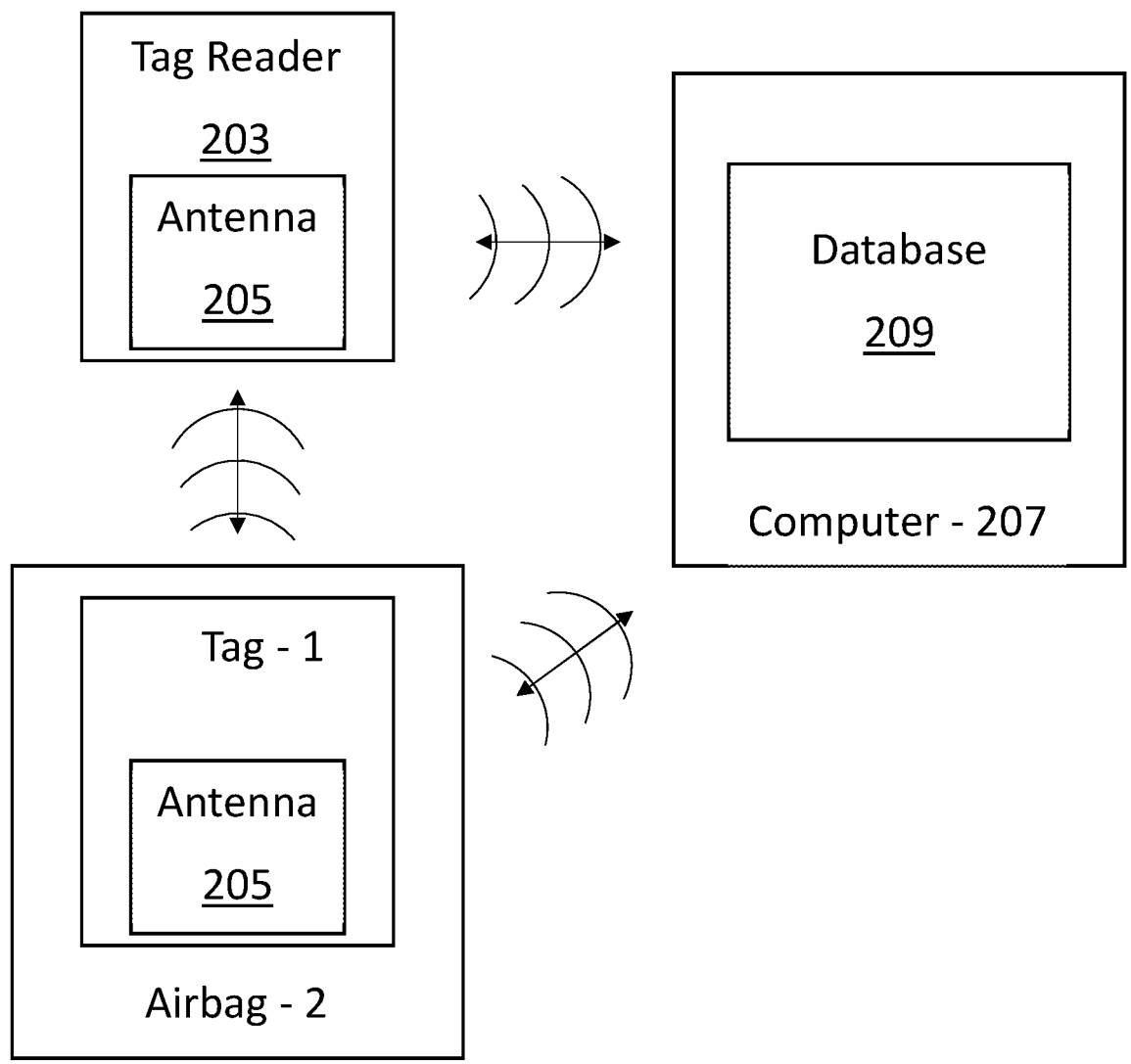
FIG. 2 is an exemplary schematic diagram of a tag, a tag reader and a computer in communication with each other, according to the present invention.

The main components of the equipment are the following:
- a tag (1) (FIG. 1), attached to the airbag (2) in an appropriate manner and having the unique identification data, information,
- a tag (1) reader that reads and/or records the unique tag (1) identification and/or other data/information and has communication means to check the read data/information
- a database for storing the airbag tag (1) and vehicle linking data, information.

In the present invention, the tag (1) is an electronic device comprising an antenna (205), a data storage device linked with it, a memory module, a computation device for performing actions in the tag (1), controlling processes in the tag (1), and other components of the tag (1). In this case, the antenna (205) is used not only to receive and send signals, but also to receive the energy needed to operate the tag (1). The signals received by the antenna (205) in the form of electromagnetic waves not only transmit data but also act as energy for the tag (1) to power. Other energy supply methods are also available to ensure the functioning of the tag (1), such as an internal (in the tag (1)) power source (battery, rechargeable battery, etc.). The tag (1) memory module is designed to store the unique tag identification data, information indefinitely, even without using electricity. The identification data, information can be recorded once at the beginning of the use of the tag (1) or possible recording of information during the connection with the reader. In the present invention, the primary function of the tag (1) is to store the identification information indefinitely and to transmit the identification information to the reader during the connection with the reader. In addition to components of the tag (1) already mentioned (antenna, memory module), in the other cases of the present invention there is a control device, a controller which performs processes in the tag (1), other parts performing the required functions.

The tag (1) cannot perform its functions properly if its antenna (205) is damaged. In the present invention, tags (1) are designed and manufactured with antennas (205) whose size, shape and other parameters allow the antenna (205) to be attached to the airbag (2) so that the antenna (205) is necessarily damaged during the airbag (2) deployment. The airbag (2) changes its shape, size and other elements linked with the airbag (2) on which the tag (1) or part thereof can be attached are damaged during deployment. On the other hand, the antenna (205) of the tag (1) or other elements of the tag (1) that are damaged during deployment are designed and manufactured in such a way that they do not interfere to deploy the airbag (2). A different embodiment of the present invention is possible, when the antenna (205) of the tag (1) is not damaged, but other elements of the tag (1) which also cause the tag to fail. A possible embodiment of the present invention is to use a RFID tag for the tag (1).

Another device of the present invention is a tag reader (203). In the present invention, the tag reader (203) is an electronic device having an antenna (205) for emitting and receiving electromagnetic waves, memory modules for storing information, controllers for controlling processes in the reader, power supply, as well as communication means with external databases. In one embodiment of the present invention, the tag reader (203) has a connection to a computer (207) that is implemented using common communication means such as Bluetooth or others.

A possible embodiment of the present invention is to use a RFID reader. During the tag (I) reading, as usual, the reader (203) generates an electromagnetic field that excites the tag (1), and the tag (1) sends its identification information to the reader that reads the information to be sent. In the present invention, the most commonly used reader can only read the tag (1) information, but, readers capable of transcribing information in the tag (1) may be used if necessary. The reader has an optical information display device (screen, etc.) that shows information about the airbag status.

If the airbag (2) is installed into the vehicle by a manufacturer or by an authorized specialist capable of providing the required quality of installation, after installation of the airbag (2) with the tag (1) provided by the present invention, the tag (1) identification information in the dedicated database has to be linked to a specific vehicle. This creates a register of in-vehicle airbags that can be used to determine the airbag (2) history in the vehicle.

As mentioned above, the tag (1) is attached to the airbag (2) in such a way that when the airbag (2) deployed, the tag (1) is irreversibly damaged, e.g., the antenna (205) is cut off, so that the tag (1) can no longer function. The unique identification information assigned to the tag (1) will no longer be readable. If the vehicle is left with the same deployed airbag (2) with the damaged tag (1), the reader will no longer read the tag (1) identification information, so it will be obvious that the airbag (2) is missing or will not work properly. If the vehicle is being repaired by a certified specialist, the specialist must link the tag (1) identification number in the dedicated database with the specific vehicle after installation of a new airbag (2) with a functioning tag (1). In this way, information about the airbag (2) replacement is available in the database, and the vehicle airbag (2) history can be known.

One of the components of the invention presented in this description is the database (209). As usual the database (209) is a computer system for storing the airbag tag identification information, linking the data to vehicle specific identification information, data such as YIN number. The stored data must be adequately protected against unauthorized use, accessible only to designated persons who are authorized to use such information, most manufacturers of cars and airbags, and related entities. The database (209) is accessible via the internet or other computer network.

The method for determining the vehicle airbag history and eliminating falsification of the history has the following steps:

an airbag (2) with a tag (1), whose unique identification information is linked with a specific vehicle in a dedicated database, is installed, when the airbag (2) has deployed, the tag (1) attached to the airbag is damaged, the tag (1) can no longer be recognized by the reader.

if authorized specialists replace the airbag (2) in the vehicle, the information in the database shall be updated by entering the new airbag (1) identification information and assigning the tag (1) to the specific vehicle, for the purpose of checking the vehicle airbag (2) history, the tag 1) identification information shall be read by a reader which checks in a dedicated database whether the airbag (2) identification information assigned to the vehicle matches that which was read for checking the vehicle.

The steps described above are not necessarily in the same sequence of time as the present invention functions. As shown, the reader is placed near the airbag (2) to be checked for checking the airbag (2) history. Then if the airbag (2) tag (1) is readable, the reader contacts the database directly or via a connected computer and checks whether the read airbag (2) identification data match the data of that vehicle airbag recorded in the database. If the data match, this means that the airbag (2) in the vehicle is reliable and of good quality. It is possible to check whether the read airbag (2) identification data match the identification data of the original airbag (2) installed in the vehicle. If the data is the same, the vehicle still has the original airbag (2) installed by the manufacturer. If the read data does not match the original airbag (2) data, but match other identification data in the database, then it is stated that the vehicle has a non-original airbag (2), but it is installed by authorized specialists and therefore it is reliable. If the reader does not read any airbag (2) identification data, this indicates that the vehicle is not equipped with a reliable airbag (2).

In order to illustrate and describe the invention, the description of the preferred embodiments is presented above. This is not a detailed or restrictive description to determine the exact form or embodiment. The above description should be viewed more than the illustration, not as a restriction. It is obvious that specialists in this field can have many modifications and variations. The embodiment is chosen and described in order to best understand the principles of the present invention and their best practical application for the various embodiments with different modifications suitable for a specific use or implementation adaptation. It is intended that the scope of the invention is defined by the definition added to it and its equivalents, in which all of these definitions have meaning within the broadest limits, unless otherwise stated.

In the embodiments described by those skilled in the art, modifications may be made without deviating from the scope of this invention as defined in the following definition.

The invention claimed is:

1. An equipment for eliminating falsification of vehicle airbag deployment history comprising:

a tag attached to an airbag having unique identification information, the tag further comprising an antenna;

a tag reader that reads and/or records the unique identification data information and has communication means for sending and receiving the read identification data information; and a database in communication with the tag reader, wherein the database comprises identification information of each tag linked with vehicle identification information of a respective specific vehicle, wherein when the airbag deploys, the antenna of the tag is cut off, so that the tag can no longer function.

2. The equipment for eliminating falsification of vehicle airbag deployment history according to claim 1, wherein the tag used is a RFID tag, and the reader is a RFID reader.

3. The equipment for eliminating falsification of vehicle airbag deployment history according to claim 1, wherein the tag has a memory module for storing the data, information for unlimited time, even in case of power failure.

4. The equipment for eliminating falsification of vehicle airbag deployment history according to claim 1, wherein the tag reader has communication means for transmitting the read identification data information to a computer.

5. A method for eliminating falsification of vehicle airbag deployment history comprising the steps of:

installing an airbag with a tag in a vehicle, whose unique identification information is linked with the vehicle in a database;

wherein when the airbag deploys, the tag attached to the airbag is damaged, the tag can no longer be recognized by a tag reader;

wherein if authorized specialists replace the airbag in the vehicle with a new airbag having a tag, the information in the database is updated by entering the identification information of the new airbag and assigning the tag of the new airbag to the vehicle; and wherein for the purpose of checking airbag history of the vehicle, the identification information of the airbag is read by the tag reader which checks in the database whether the airbag identification information assigned to the vehicle matches that which was read when checking the vehicle.

* * * * *